April 9, 1929.                B. E. G. NOBLE                1,708,771
                         AUTOMATIC CHEESE SLICER
                     Filed Sept. 1, 1928      3 Sheets-Sheet 1
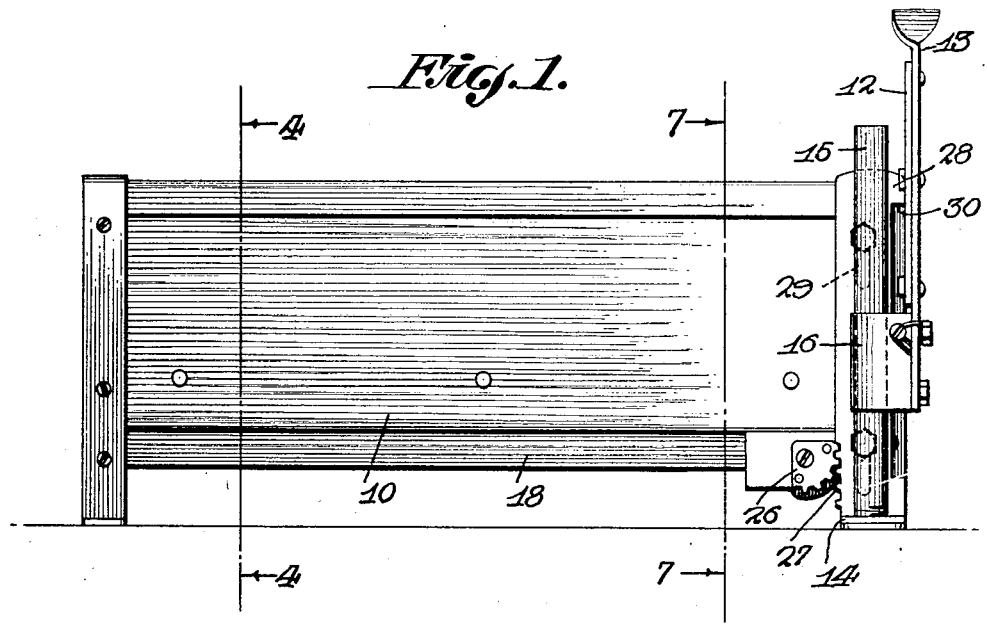
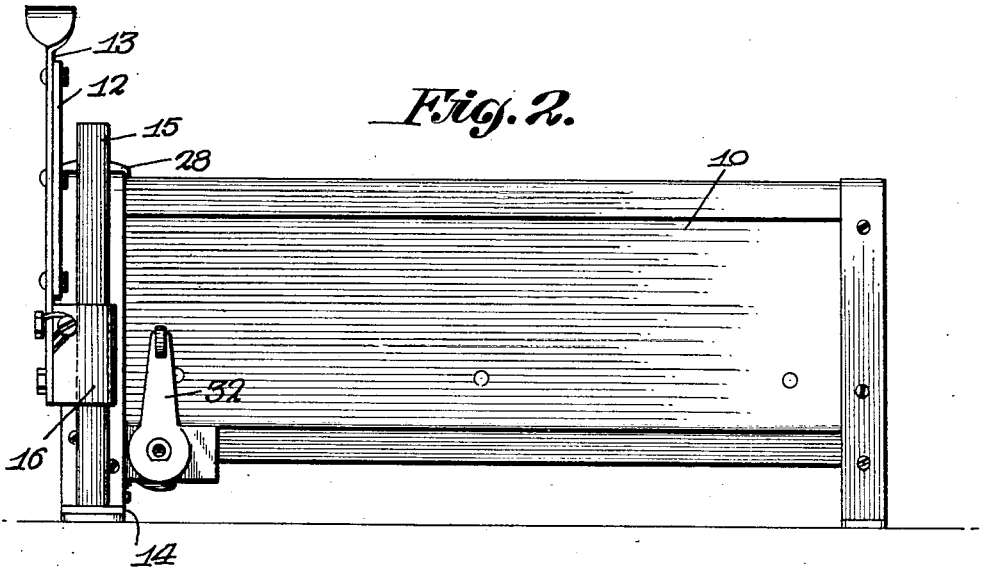
Bion E. G. Noble,
INVENTOR
BY Victor J. Evans
ATTORNEY April 9, 1929.  B. E. G. NOBLE  1,708,771
AUTOMATIC CHEESE SLICER
Filed Sept. 1, 1928  3 Sheets-Sheet 2
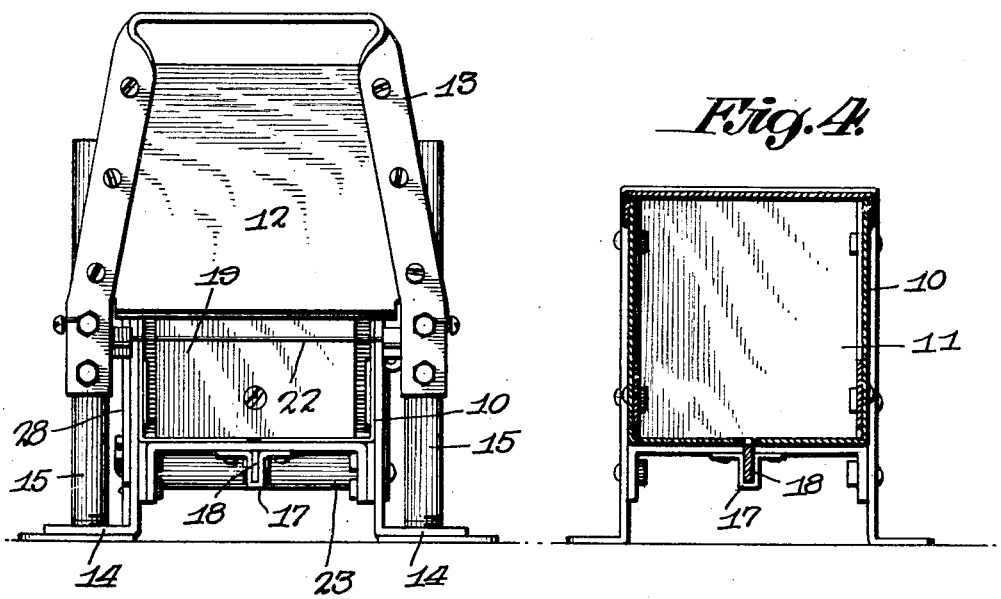
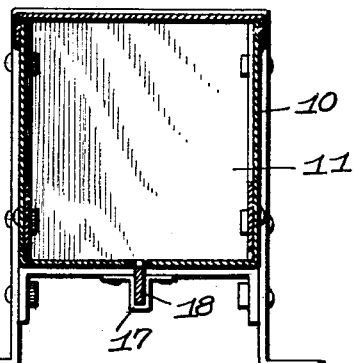
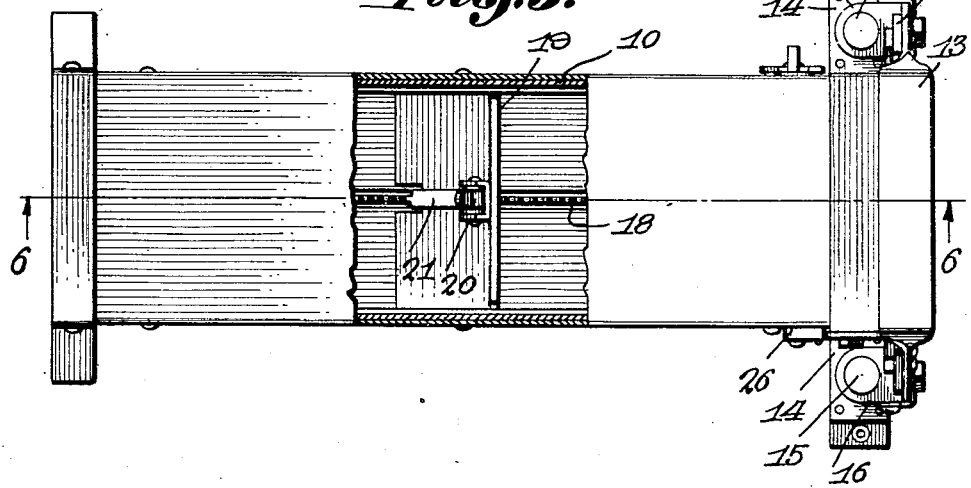
Bion E. G. Noble,
INVENTOR
BY Victor J. Evans
ATTORNEY April 9, 1929. B. E. G. NOBLE 1,708,771
AUTOMATIC CHEESE SLICER
Filed Sept. 1, 1928 3 Sheets-Sheet 3
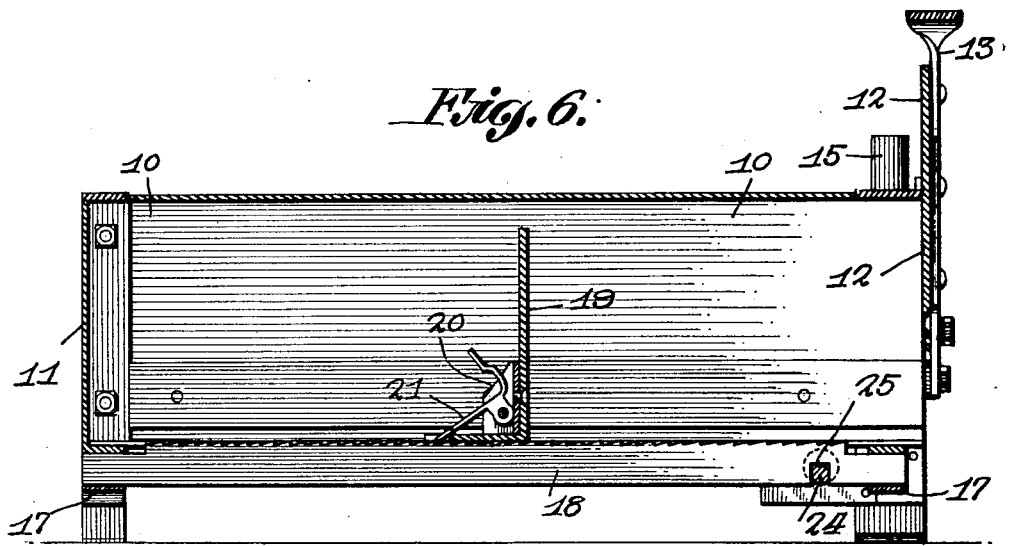
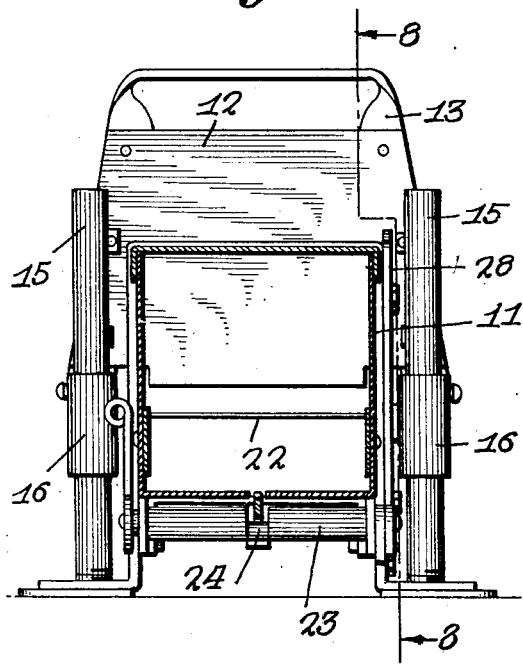
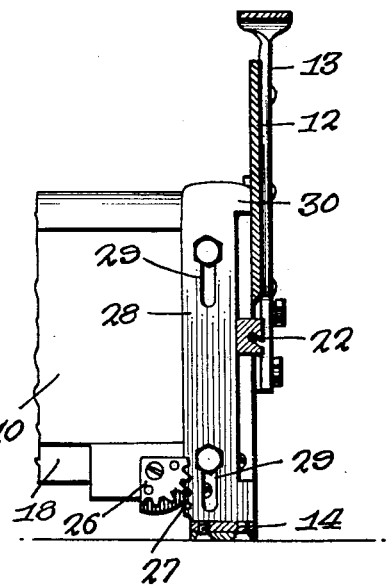
Bion E. G. Noble, INVENTOR
BY Victor J. Evans
ATTORNEY Patented Apr. 9, 1929.

1,708,771

UNITED STATES PATENT OFFICE.

BION E. G. NOBLE, OF PORTLAND, MAINE.

AUTOMATIC CHEESE SLICER.

Application filed September 1, 1928. Serial No. 303,484.

This invention contemplates the provision of an automatic slicing machine primarily intended for slicing cheese but which may also be advantageously used for other purposes, the invention residing in the novel construction and arrangement of parts as claimed.

The invention essentially embodies a casing for the reception of the article to be sliced, and in which casing is arranged a follower utilized to project the article step by step predetermined distances according to the desired thickness of the slice to be severed, with means for automatically shifting the follower as the cutter is actuated.

More specifically stated the machine includes a sliding cover supporting frame which also supports the cutting element, and in accordance with the present invention I provide means for shifting the follower a predetermined distance as the said cover frame is moved to a position above the article to be severed, during which time the article is projected a predetermined distance from the casing to be sliced as the cutter is moved in one direction.

Another important object of the invention resides in the provision of means whereby the follower can be adjusted in a quick and convenient manner independently of the cutter carrying frame, so that after the cutter has been moved to a position to sever a slice from the article, the article can be projected any desired distance from the casing so that slices of different thicknesses can be severed as the occasion may require.

Other objects and advantages will appear when the following detail description is read in connection with the accompanying drawings, the invention residing in the construction, combination and arrangement of parts as claimed.

In the drawings forming part of this application like numerals of reference indicate similar parts in the several views and wherein:

Figure 1 is a side elevation of the machine forming the subject matter of the present invention.

Figure 2 is a similar view looking at the opposite side of the machine.

Figure 3 is an end elevation showing the cover and cutter carrying frame elevated.

Figure 4 is a sectional view on line 4—4 of Figure 1.

Figure 5 is a top plan view partly in section.

Figure 6 is a sectional view on line 6—6 of Figure 5.

Figure 7 is a sectional view on line 7—7 of Figure 1.

Figure 8 is a sectional view on line 8—8 of Figure 7.

Referring to the drawings in detail, 10 indicates a casing which may be constructed from any suitable material and also vary in size and configuration depending upon the character of the article to be dealt with. As herein illustrated the casing is elongated in contour, being primarily intended to receive a length of cheese, butter or the like, the casing being closed at one end by a wall 11 and open at its other end so that the article to be severed can be projected from the casing in a manner to be hereinafter described.

This open end of the casing is however, controlled by the sliding cover 12 which is supported by a substantially U-shaped frame 13 which is also utilized as a handle operating the cover as will be readily understood. The casing 10 is surrounded at both ends by straps which project an appreciable distance beneath the casing and off-set to provide feet or supports whereby the casing is maintained in spaced relation to the counter, table or other support upon which it is mounted. These feet are indicated at 14, and rising from the feet arranged at the forward end of the machine are guide posts 15 which slidably support sleeves 16 carried by the cover supporting frame 13, whereby the latter mentioned frame is mounted for sliding movement upon the posts 15. The bottom of the casing 10 is longitudinally slotted, and depending from the bottom are channel-shaped guides 17 which support a rack bar 18 which is mounted for longitudinal movement with relation to the casing 10, the teeth of the rack bar being located in the slot formed in the bottom and lying substantially flush with the surface thereof. A follower 19 is arranged within the casing and carries a bracket 20 upon which is pivotally mounted a pawl 21, the latter normally engaging the piece of the rack bar 18 as clearly illustrated in Figure 6. The rack bar is adapted to be reciprocated to adjust the follower 19 step by step, so that the article to be severed is projected beyond one end of the casing a predetermined distance with each operation of the rack bar 18.

As hereinabove stated this operation is controlled automatically by the movement of the cover 12, or it can be effected by means independently of the cover for a purpose to be presently described. The cover carrying frame 13 also supports a cutting element 22 preferably in the nature of a wire as illustrated, this wire being arranged directly beneath the lower edge of the cover as illustrated in Figure 3.

Journaled in suitable bearings arranged transversely beneath the casing 10 is a rock shaft 23, which is formed with an intermediate reduced cam-like portion 24 received by a slot 25 formed in the rack bar 18, so that as the shaft 23 is rocked the rack bar is reciprocated. When the rack bar 18 moves forwardly the follower 19 is moved therewith a predetermined distance, and when the rack bar 18 is moved rearwardly the pawl 21 idles over the teeth and gravitates to engage the next adjacent tooth as will be readily understood. Consequently with each operation of the rock shaft 23 the rack bar 18 is shifted forwardly and rearwardly the distance of one tooth, and the follower is simultaneously adjusted to fit the same distance for one step. The article contained within the casing is projected a similar distance so that it can be severed by the cutting element 22. One end of the shaft 23 has a toothed section 26 the teeth of which engage the teeth 27 formed on the adjacent longitudinal edge of a slide 28, the latter being mounted for vertical adjustment on one side of the casing 10 and formed with longitudinal slots 29 for this purpose.

The upper end of the slide 28 is formed with an off-set 30 above the upper edge of the casing 10 and also disposed in the path of movement of the adjacent sleeve 16 to be engaged by the latter during the upward movement of the cover 12 and cutter element 22 both of which are carried by the frame 13.

In practice, the follower 19 is arranged adjacent the closed end 11 of the casing and the article to severed is then arranged within the casing. The cover 12 and cutter element 22 are elevated as a unit being supported by the frame 13 which is utilized as a handle for elevating said parts, and just before the cover reaches the limit of its upward movement, one of the sleeves 16 engages the off-set portion 30 of the slide 28 thereby lifting the latter and imparting movement to the toothed section 26. This section manifestly rocks the shaft 23 which shifts the rack bar 18 forwardly a predetermined distance. As the pawl 21 is engaged with this bar 18 the follower 19 is also shifted a similar distance. Consequently after the cutter element 22 has been raised a distance slightly above the upper edge of the casing 10 the article within the casing 10 has been projected a slight distance therefrom, so that when the cover and cutter element are lowered the article will be sliced. During this cutting operation, the shaft 23 is rocked in an opposite direction thereby moving the rack bar 18 rearwardly, during which movement of the rack bar the pawl 21 idles over the teeth thereof and gravitates to engage the next adjacent tooth. In this manner the follower 19 is automatically operated incident to the movement of the cutter carrying frame 13 so that articles to be severed are projected a predetermined distance beyond the casing with each operation.

However, it may be desired to vary the thickness of the slice from time to time or cut the article into comparatively large pieces which, of course, requires some means for effecting an adjustment of the follower independently of the cover carrying frame 13. For this purpose I provide the shaft 23 at one end with a lever 32, so that after the cover 12 and cutter element 22 have been elevated to a position above the casing 10, the lever 32 can be actuated to reciprocate the rack bar 18 thereby adjusting the follower 19 until the article to be severed has been projected the desired distance beyond the open end of the casing. Consequently by use of the lever 32 the article can be projected so that the thickness of the slices to be severed can be varied in a quick and convenient manner.

While it is believed that from the foregoing description the nature and advantages of the invention can be readily apparent, I desire to have it understood that I do not limit myself to what is herein illustrated and described, and that such changes may be resorted to as fall within the scope of what is claimed.

What I claim is:

1. A machine of the character described comprising a casing open at one end and adapted to receive an article to be sliced, guide posts arranged upon opposite sides of the open end, a frame, a cover for the open end and carried by the frame, sleeves on the frame and mounted on the posts for slidable movement, a cutting element mounted for movement across the open end of said casing and carried by the frame below the cover, said casing having a longitudinal slot in the bottom thereof, a rack bar mounted for reciprocatory movement and operable in said slot, a follower movable within the casing and adapted to project the article therefrom a predetermined distance equal to the thickness of the slice to be severed, a pawl pivoted on said follower and normally engaging the teeth of said rack bar and adapted to be adjusted step by step incident to the movement of said bar, means for simultaneously reciprocating said bar incident to the movement of said cutting element, said means including a rock shaft reduced between its ends to provide a cam engageable in a slot in the rack bar, a slide carried by the casing and being provided with teeth, a toothed segment secured to the rack shaft and arranged for engagement of the teeth thereof with the teeth of the slide, a projection on the slide and arranged in the path of one sleeve whereby this sleeve engages the projection for moving the slide and means for reciprocating said bar independently of said cutting element.

2. A machine of the character described comprising a casing open at one end and adapted to receive an article to be sliced, said casing having a longitudinal slot in the bottom thereof, a rack bar mounted for reciprocatory movement and operable in said slot, a cutting element mounted for movement across the open end of said casing, a follower movable within the casing and adapted to project the article therefrom a predetermined distance equal to the desired thickness of the slice to be severed, said rack bar having a vertical slot, a shaft journaled beneath the casing and including a reduced cam-like portion operated in said slot for the rack bar whereby the latter is reciprocated incident to the rocking movement of said shaft, means for rocking said shaft simultaneously with the movement of said cutting element, and means for rocking said shaft independently of said cutting element.

In testimony whereof I affix my signature.

BION E. G. NOBLE.